(12) United States Patent
Han et al.

(10) Patent No.: US 10,140,527 B2
(45) Date of Patent: Nov. 27, 2018

(54) APPARATUS AND METHOD FOR RECOGNIZING DRIVING LANE OF VEHICLE

(71) Applicant: HYUNDAI MOTOR COMPANY, Seoul (KR)

(72) Inventors: Young Min Han, Bucheon-si (KR); Dae Youn Um, Suwon-si (KR); Jee Young Kim, Yongin-si (KR); Seung Geon Moon, Busan (KR)

(73) Assignee: Hyundai Motor Company, Seoul (KR)

( * ) Notice: Subject to any disclaimer, the term of this patent is extended or adjusted under 35 U.S.C. 154(b) by 293 days.

(21) Appl. No.: 14/522,252

(22) Filed: Oct. 23, 2014

(65) Prior Publication Data

US 2015/0379359 A1   Dec. 31, 2015

(30) Foreign Application Priority Data

Jun. 30, 2014  (KR) ........................ 10-2014-0081143

(51) Int. Cl.
| | |
|---|---|
| *G06K 9/00* | (2006.01) |
| *G01C 21/30* | (2006.01) |
| *B60R 1/00* | (2006.01) |

(52) U.S. Cl.
CPC ............ *G06K 9/00798* (2013.01); *B60R 1/00* (2013.01); *G01C 21/30* (2013.01)

(58) Field of Classification Search
None
See application file for complete search history.

(56) References Cited

U.S. PATENT DOCUMENTS

| | | | |
|---|---|---|---|
| 2001/0056326 A1* | 12/2001 | Kimura ................. | G01C 21/30 701/446 |
| 2003/0204299 A1* | 10/2003 | Waldis ............... | B60K 31/0008 701/96 |
| 2008/0077322 A1 | 3/2008 | Sumizawa | |
| 2009/0295922 A1* | 12/2009 | Mori ........................ | B60R 1/00 348/148 |

(Continued)

FOREIGN PATENT DOCUMENTS

| | | |
|---|---|---|
| CN | 102941851 A | 2/2013 |
| CN | 103077371 A | 5/2013 |

(Continued)

OTHER PUBLICATIONS

Chinese Office Action issued in Application No. 2014106385690 dated Jul. 2, 2018, with English translation.

*Primary Examiner* — William C Vaughn, Jr.
*Assistant Examiner* — Stuart D Bennett
(74) *Attorney, Agent, or Firm* — McDermott Will & Emery LLP

(57) ABSTRACT

An apparatus for recognizing a driving lane of a vehicle includes a first lane attribute information extractor configured to extract front lane attribute information from a front image of the vehicle. A second lane attribute information extractor is configured to extract current position lane attribute information depending on a current position and a progress direction of the vehicle. A driving lane determiner is configured to determine a current driving lane of the vehicle depending on the front lane attribute information and the current position lane attribute information.

12 Claims, 4 Drawing Sheets

(56) References Cited

U.S. PATENT DOCUMENTS

| | | | |
|---|---|---|---|
| 2012/0314070 A1* | 12/2012 | Zhang | B60W 40/00 348/148 |
| 2014/0050362 A1* | 2/2014 | Park, II | G06K 9/00791 382/104 |
| 2014/0306844 A1 | 10/2014 | Kim | |
| 2015/0248588 A1* | 9/2015 | Ishigami | G06K 9/00798 382/104 |

FOREIGN PATENT DOCUMENTS

| | | |
|---|---|---|
| CN | 104108392 A | 10/2014 |
| JP | 09-178505 A | 7/1997 |
| JP | 2006-329832 A | 12/2006 |
| KR | 1998-065231 A | 10/1998 |
| KR | 1999-0034609 A | 5/1999 |
| KR | 10-2005-0042889 A | 5/2005 |
| KR | 10-2010-0063372 A | 6/2010 |
| WO | 2013/065256 A1 | 5/2013 |

\* cited by examiner

APPARATUS AND METHOD FOR RECOGNIZING DRIVING LANE OF VEHICLE

CROSS-REFERENCE TO RELATED APPLICATION

This application is based on and claims the benefit of priority to Korean Patent Application No. 10-2014-0081143, filed on Jun. 30, 2014 in the Korean Intellectual Property Office, the disclosure of which is incorporated herein in its entirety by reference.

TECHNICAL FIELD

The present disclosure relates to an apparatus and a method for recognizing a driving lane of a vehicle capable of recognizing the driving lane of the vehicle and tracking the driving lane depending on a lane change, using a front camera and lane attribute information.

BACKGROUND

Recently, automobile industries have been developing an advanced driver assistance system (ADAS) which offers a great deal of convenience and safety to a driver.

A system for predicting front road environment and providing appropriate control and convenience services using map information (or high-precision map information, ADAS map) has been developing. However, when a junction and an intersection are present in front of a vehicle, an expected path may not be understood, or when the vehicle does not drive along the understood path, a malfunction of the control and the convenience services may cause. The system may not offer the appropriate control and convenience services when at least one drivable road (junction and intersection) is present or may often limit the control and convenience services.

Therefore, for the vehicle to predict the driving road after the junction or the intersection, it is essential to determine a lane on which the vehicle is currently driving.

The related art provides a technology of determining a driving lane based on a front camera and a lane change signal and may determine the driving lane only for specific lanes, such as a bus lane, a rightmost lane, and a leftmost lane, and can track the driving lane only using a lane change signal in the case of non-specific lane.

SUMMARY

The present disclosure has been made to solve the above-mentioned problems occurring in the prior art while advantages achieved by the prior art are maintained intact.

An aspect of the present disclosure provides an apparatus and a method for recognizing a driving lane of a vehicle capable of recognizing the driving lane of the vehicle and tracking the driving lane depending on a lane change, using a front camera and lane attribute information.

According to an exemplary embodiment of the present invention, an apparatus for recognizing a driving lane of a vehicle includes a first lane attribute information extractor configured to extract front lane attribute information from a front image of the vehicle. A second lane attribute information extractor is configured to extract current position lane attribute information depending on a current position and a progress direction of the vehicle. A driving lane determiner is configured to determine a current driving lane of the vehicle depending on the front lane attribute information and the current position lane attribute information.

The first lane attribute information extractor may include a front camera installed in front of the vehicle and configured to photograph the front image. An image processor is configured to extract the front lane attribute information of the current driving lane from the front image.

The front lane attribute information may include a style and a color of the driving lane and lane change information.

The second lane attribute information extractor may include a sensor mounted in the vehicle and configured to measure vehicle information. A global positioning system (GPS) antenna is configured to be mounted in the vehicle to receive satellite information propagated from a satellite. A storage is configured to store map data and lane attribute database. A lane attribute information output unit is configured to calculate the current position and progress direction of the vehicle using the vehicle information and the satellite information and extract the current position lane attribute information based on the current position and progress direction of the vehicle.

The lane attribute information output unit may search for a driving road based on the current position and the progress direction and extract lane attribute information of a specific spot on the driving road within a predetermined front distance from the vehicle from the lane attribute database to output the current position lane attribute information.

The driving lane determiner may include a driving lane matcher configured to compare the front lane attribute information with the current position lane attribute information to calculate matching points for each lane based on a compared result and to output a lane having the largest matching point among the calculated matching points for each lane as a driving lane matching result. A driving lane tracker is configured to calculate a driving lane of present time based on a previous driving lane and the lane change information provided by the first lane attribute information extractor and output the calculated driving lane of the present time as a driving lane tracking result. A fuser is configured to determine any one of the driving lane matching result and the driving lane tracking result based on the driving lane matching result and a result mode thereof and the driving lane tracking result and a result mode thereof as the current driving lane of the vehicle.

The driving lane matcher may use a front camera recognition as a weight to calculate the matching points.

The fuser may determine the driving lane matching result as the current driving lane of the vehicle when the driving lane matching result is 1 and the driving lane matching result matches the driving lane tracking result within a set time.

The fuser may determine the driving lane tracking result as the current driving lane of the vehicle when the driving lane matching result is 1 and the driving lane matching result mismatches the driving lane tracking result within a set time.

The fuser may determine the driving lane matching result as the current driving lane of the vehicle when the driving lane matching result exceeding a set time is received or the driving lane tracking result is not present and the driving lane matching result is 1.

The fuser may determine the driving lane tracking result as the current driving lane of the vehicle when a plurality of driving lane matching results are present and the driving lane tracking result is included in the plurality of driving lane matching results.

The fuser may determine the driving lane tracking result as the current driving lane of the vehicle when a plurality of driving lane matching results are present and the driving lane tracking result within a set time is not included in the plurality of driving lane matching results.

The fuser may determine the current driving lane of the vehicle as no recognition state when the driving lane tracking result exceeding a set time is not included in a plurality of driving lane matching results or the driving lane tracking result is not present and only the plurality of driving lane matching results are present.

The fuser may determine the driving lane tracking result as the current driving lane when the driving lane matching result is not present but only the driving lane tracking result is present.

The fuser may determine the current driving lane as no recognition when no driving lane matching result and driving lane tracking result are present.

According to another exemplary embodiment of the present invention, a method for recognizing a driving lane of a vehicle includes extracting front lane attribute information of the driving road from a front image and extracting current position lane attribute information using vehicle information and satellite information. The front lane attribute information is compared with the current position lane attribute information, a driving lane matching result is calculated based on the compared result, and a driving lane tracking result is calculated based on a previous driving lane and lane change information. Any one of the driving lane matching result and the driving lane tracking result are determined as a current driving lane of the vehicle based on the driving lane matching result and the driving lane tracking result and a result mode thereof.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present invention will be described in detail with reference to the accompanying drawings.

Figure 1:
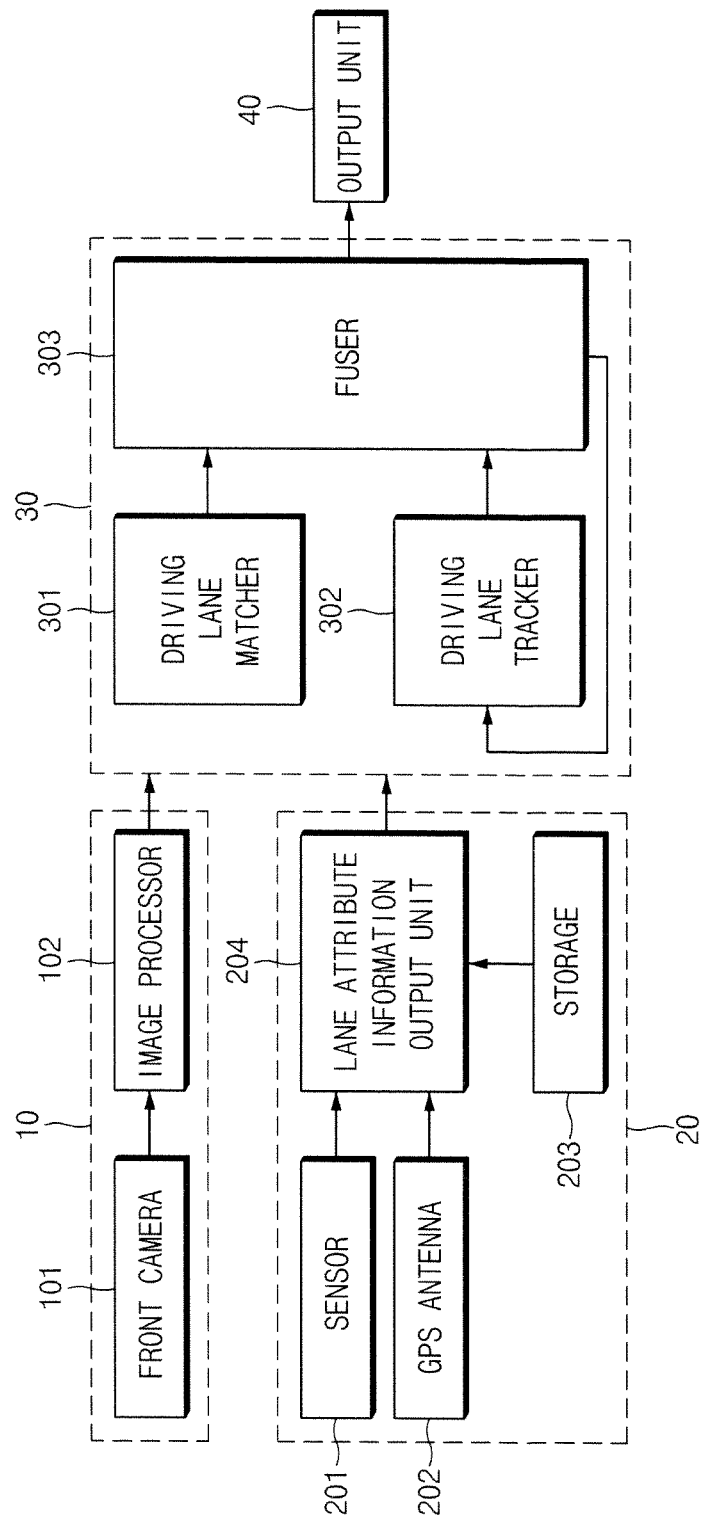
FIG. 1 is a block configuration diagram illustrating an apparatus for recognizing a driving lane of a vehicle according to an exemplary embodiment of the present invention.

FIG. 1 is a block configuration diagram illustrating an apparatus for recognizing a driving lane of a vehicle according to an exemplary embodiment of the present invention.

Referring to FIG. 1, the apparatus for recognizing a driving lane according to the exemplary embodiment of the present invention includes a first lane attribute information extractor 10, a second lane attribute information extractor 20, a driving lane determiner 30, and an output unit 40.

The first lane attribute information extractor 10 extracts front lane attribute information from a front image of the vehicle. The first lane attribute information extractor 10 includes a front camera 101 and an image processor 102.

The front camera 101 is installed on a front surface of the vehicle to photograph the front image of the vehicle.

The image processor 102 performs image processing to extract the front lane attribute information from the front image. Here, the front lane attribute information includes: a lane style (solid line, dashed line, double solid line, left dashed line, right solid line, left solid line, right dashed line, short dashed line, thick dashed line, and the like); a lane color (white, yellow, blue, red, and the like); and lane change information (left change, right change).

The image processor 102 extracts the lane attribute information on a predetermined number of lanes depending on a current driving lane. For example, the image processor 102 extracts lane attribute information on first left/right lanes and a second lane of a current driving lane.

The second lane attribute information extractor 20 extracts current position lane attribute information from lane attribute database (DB) based on a current position and a progress direction of the vehicle. The second lane attribute information extractor 20 includes a sensor 201, a global positioning system (GPS) antenna 202, a storage 203, and a lane attribute information output unit 204.

The sensor 201 is mounted in the vehicle to measure vehicle information. Herein, the vehicle information includes a direction, a vehicle velocity, and the like. The sensor 201 includes a geomagnetic sensor (orientation sensor), a gyro sensor (angular velocity sensor), a vehicle velocity sensor, and the like.

The GPS antenna 202 is mounted in the vehicle and receives satellite information (satellite signal) propagated from a satellite.

Figure 2:
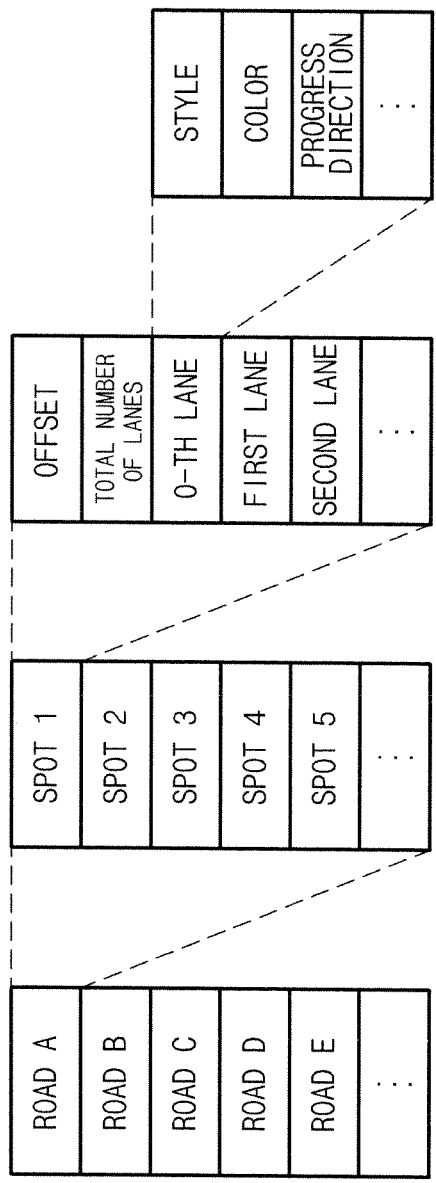
FIG. 2 is a diagram illustrating a configuration of a lane attribute database according to an exemplary embodiment of the present invention.

The storage 203 is stored with map data and the lane attribute database. As illustrated in FIG. 2, the lane attribute database is configured in a tree structure and is configured to include at least one link data. The link data is configured of at least one spot data, in which the spot data includes an offset from a link starting point, a total number of lanes, lane attribute information (style, color, and progress direction) for each lane, and the like.

The lane attribute information output unit 204 uses the vehicle information and the satellite information to calculate the current position and progress direction of the vehicle. Further, the lane attribute information output unit 204 searches for the driving road depending on the current position and the progress direction, and extracts lane attribute information of a specific spot on the driving road within a predetermined front distance from the vehicle from the lane attribute database to output the current position lane attribute information.

The driving lane determiner 30 determines the current driving lane of the vehicle depending on the front lane attribute information and the current position lane attribute information. The driving lane determiner 30 includes a driving lane matcher 301, a driving lane tracker 302, and a fuser 303.

The driving lane matcher 301 compares the front lane attribute information with the current position lane attribute information to calculate matching points of each lane. That is, the driving lane matcher 301 sets a matching point to be 1 when the front lane attribute information matches the current position lane attribute information and sets a matching point to be 0 when the front lane attribute information does not match the current position lane attribute information to calculate the matching points. In this case, the driving lane matcher 301 uses a previously suggested recognition of the front camera as a weight w to calculate a matching point MP depending on the following Equation 1.

$$MP^n = w_{type}^{L1} \times (MAP_{type}^{n-2} == CAM_{type}^{L1}) +$$
$$w_{type}^{L0} \times (MAP_{type}^{n-1} == CAM_{type}^{L0}) +$$
$$w_{type}^{R0} \times (MAP_{type}^{n} == CAM_{type}^{R0}) +$$
$$w_{type}^{R1} \times (MAP_{type}^{n+1} == CAM_{type}^{R1}) +$$
$$w_{color}^{L1} \times (MAP_{color}^{n-2} == CAM_{color}^{L1}) +$$
$$w_{color}^{L0} \times (MAP_{color}^{n-1} == CAM_{color}^{L0}) +$$
$$w_{color}^{R0} \times (MAP_{color}^{n} == CAM_{color}^{R0}) +$$
$$w_{color}^{R1} \times (MAP_{color}^{n+1} == CAM_{color}^{R1}),$$

[Equation 1]

where MP represents a matching point, MAP represents current position lane attribute information, and CAM represents front lane attribute information.

Figure 3:
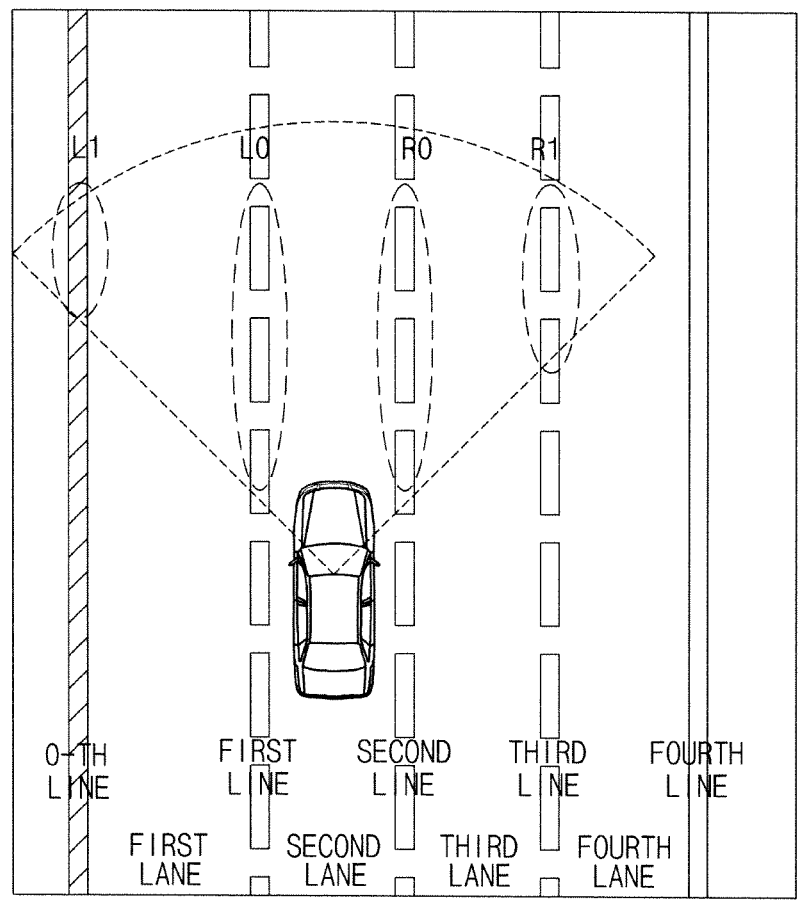
FIG. 3 is an exemplified diagram for describing a process for recognizing a driving lane according to an exemplary embodiment of the present invention.

For example, as illustrated in FIG. 3, when a vehicle drives on a second lane, the driving lane matcher 301 uses the current position lane attribute information (MAP) of Table 1, the front lane attribute information (CAM) of Table 2, and a front camera recognition (weight w) of Table 3 to calculate the matching points MPs for each lane as shown in Table 4.

TABLE 1

| Lane | 0 | 1 | 2 | 3 | 4 |
|---|---|---|---|---|---|
| Style | Solid Line (Double) | Dashed Line | Dashed Line | Dashed Line | Solid Line |
| Color | Yellow | White | White | White | White |

TABLE 2

| Lane | L1 | L0 | R0 | R1 |
|---|---|---|---|---|
| Style | Solid Line (Double) | Dashed Line | Dashed Line | No Recognition |
| Color | No Recognition | White | White | No Recognition |

TABLE 3

| Lane | L1 | L0 | R0 | R1 |
|---|---|---|---|---|
| Style | 0.2 | 0.85 | 0.85 | 0.2 |
| Color | 0.1 | 0.5 | 0.5 | 0.1 |

TABLE 4

| Lane | 1 | 2 | 3 | 4 |
|---|---|---|---|---|
| MP | 2.2 | 2.9 | 2.7 | 1.85 |

The driving lane matcher 301 calculates the matching points for each lane and determines a lane having the largest value among the matching points for each lane as the driving lane. For example, the driving lane matcher 301 determines the second lane having the largest matching point among the matching points for each lane calculated as in Table 4 as the driving lane. The driving lane matcher 301 outputs the determined driving lane as a driving lane matching result.

The driving lane tracker 302 calculates the driving lane (current driving lane) of the present time depending on a previous driving lane determined at a previous time and the lane change information output from the first lane attribute information extractor 10. Further, the driving lane tracker 302 outputs the driving lane of the present time as a driving lane tracking result.

For example, when the driving lane tracker 302 receives the left lane change signal from the first lane attribute information extractor 10, the driving lane tracker 302 subtracts (−)1 from the previous driving lane number to calculate the driving lane (current driving lane) of the present time. When the driving lane tracker 302 receives the right lane change signal from the first lane attribute information extractor 10, the driving lane tracker 302 adds (+)1 to the previous driving lane number to calculate the driving lane number (driving lane) of the present time. When the driving lane tracker 302 does not receive the lane change information from the first lane attribute information extractor 10, the driving lane tracker 302 maintains the previous driving lane.

The driving lane tracker 302 uses the current position lane attribute information output from the second lane attribute information extractor 10 to confirm validation of the calculated driving lane. When the driving road is a general road, the driving lane tracker 302 confirms whether the calculated driving lane is equal to or less than 0 or exceeds a total number of lanes. The driving lane tracker 302 determines the validation of the driving lane when a vehicle passes through a junction or an intersection.

The driving lane tracker 302 increases a tracking counter by +1 every time it tracks the driving lane. The tracking counter is used to confirm the tracking validation.

The fuser 303 determines the driving lane on which a vehicle is currently driving depending on results of the driving lane matcher 301 and the driving lane tracker 302.

The driving lane matching and the driving lane tracking have advantages and disadvantages as described in the following Table 5.

TABLE 5

| | Advantage | Disadvantage |
|---|---|---|
| Driving lane tracking | Robustness against camera data error (noise), Irrelevance to map data error | Reduction in reliability over time, Reduction in reliability under complicated road environment |
| Driving lane matching | Irrelevance of reliability to time since driving lane is determined only by data for present time | Vulnerable to error of camera data and map data, Possibility of generation of a plurality of driving lane solutions |

The fuser 303 reflects the above characteristics of Table 5 to determine the driving lane tracking result or the driving lane matching result as a final driving lane according to situations.

The fuser 303 is divided into 12 modes as shown in the following Table 6 according to the driving lane tracking result and the driving lane matching result and a result mode thereof.

In a first mode (mode 01), the driving lane matching result is 1, and the driving lane tracking result tracked within a set time matches the driving lane matching result. Here, the set time is a time which is not affected by errors of the camera data and the map data at the time of tracking the driving lanes.

In a second mode (mode 02), the driving lane matching result is 1, and the driving lane tracking result tracked within the set time does not match the driving lane matching result.

In a third mode (mode 03), the driving lane tracking result exceeds the set time, and the driving lane matching result is 1.

In a fourth mode (mode 04), the driving lane tracking result is not present, and the driving lane matching result is 1.

Ina a fifth mode (mode 05), a plurality of driving lane matching results are present, and the driving lane tracking result output within the set time is included in the plurality of driving lane matching results.

In a sixth mode (mode 06), the plurality of driving lane matching results are present, and the driving lane tracking result output within the set time is not included in the plurality of driving lane matching results.

In a seventh mode (mode 07), the driving lane tracking result which exceeds the set time is included in the plurality of driving lane matching results.

In an eighth mode (mode 08), the driving lane tracking result which exceeds the set time is not included in the plurality of driving lane matching results.

In a ninth mode (mode 09), the driving lane tracking result is not present, and only the plurality of driving lane matching results are present.

In a tenth mode (mode 10), the driving lane tracking result within the set time is present, and the driving lane matching result is not present.

In an eleventh mode (mode 11), the driving lane tracking result which exceeds the set time is present, but the driving lane matching result is not present.

In a twelfth mode (mode 12), the driving lane tracking result and the driving lane matching result are not present.

In the case of any one of the first, third, and fourth modes, the fuser 303 determines the driving lane matching result as the final driving lane and initiates a tracking counter.

In the case of the fifth mode, the fuser 303 determines the driving lane tracking result as the final driving lane and initiates the tracking counter. Further, in the case of any one of the second, sixth, seventh, tenth, and eleventh modes, the fuser 303 determines the driving lane tracking result as the final driving lane. In the case of the eighth, ninth, and twelfth modes, the fuser 303 determines the driving lane tracking result as no recognition of the driving lane.

TABLE 6

| | | Driving lane matching result | | |
|---|---|---|---|---|
| | | Single-Matching | Multi-Matching | Invalid |
| Driving Lane Tracking Result | in-time | Matching of tracking result with matching result: Mode 01 | Including tracking result in matching result: Mode 05 | Mode 10 |
| | | Mismatching of tracking result with matching result: Mode 02 | Non-including tracking result in matching result: Mode 06 | |
| | timeout | Mode 03 | Including tracking result in matching result: Mode 07 | Mode 11 |

TABLE 6-continued

| | Driving lane matching result | | |
|---|---|---|---|
| | Single-Matching | Multi-Matching | Invalid |
| | | Non-including tracking result in matching result: Mode 08 | |
| Invalid | Mode 04 | Mode 09 | Mode 12 |

The fuser 303 feedbacks the finally determined driving lane to the driving lane tracker 302.

The output unit 40 outputs the final driving lane output from the driving lane determiner 30 in a form which may be recognized by a user (driver, passenger). For example, the output unit 40 outputs information on the lane on which a vehicle is currently driving in a form of a text, an image, an audio, and the like.

Figure 4:
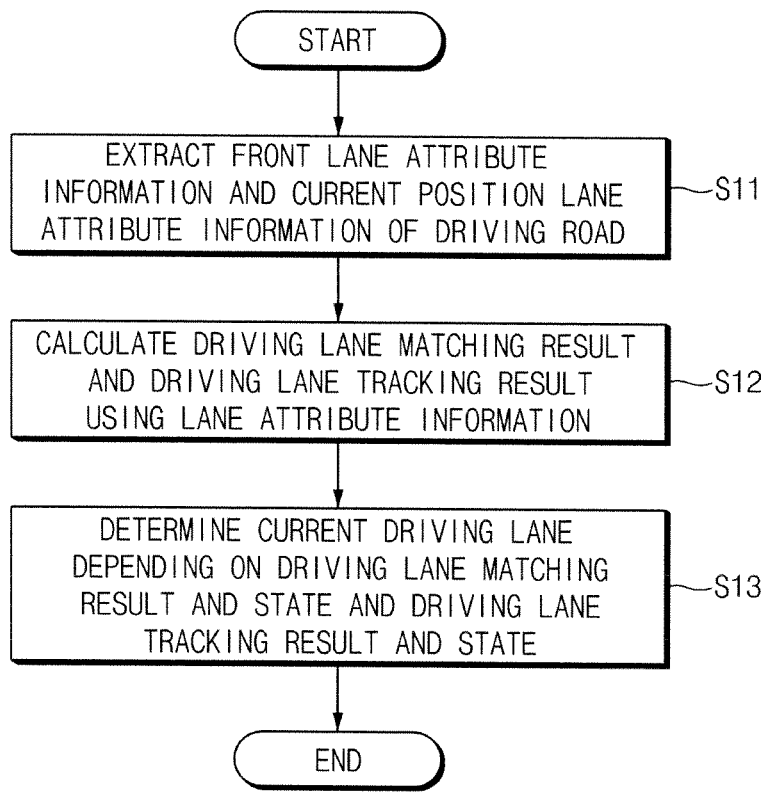
FIG. 4 is a flow chart illustrating a method for recognizing a driving lane of a vehicle according to an exemplary embodiment of the present invention.

FIG. 4 is a flow chart illustrating a method for recognizing a driving lane of a vehicle according to an exemplary embodiment of the present invention.

The apparatus for recognizing a driving lane extracts the front lane attribute information and the current position lane attribute information of the driving road (S11). The first lane attribute information extractor 10 extracts the front lane attribute information from the front image acquired through the front camera 101 and transmits the extracted front lane attribute information to the driving lane determiner 30. Further, the second lane attribute information extractor 20 uses the vehicle information measured by the sensor 201 and the satellite information received through the GPS antenna 202 to calculate a current position and progress direction of the vehicle. Further, the second lane attribute information extractor 20 extracts the current position lane attribute information from the lane attribute database stored in the storage 203 depending on the current position and progress direction of the vehicle and outputs the extracted current position lane attribute information to the driving lane determiner 30.

The driving lane determiner 30 of the apparatus for recognizing a driving lane uses the front lane attribute information and the current position lane attribute information to calculate the driving lane matching result and the driving lane tracking result (S12). In other words, the driving lane matcher 301 compares the front lane attribute information with the current position lane attribute information to calculate the matching points of each lane. Further, the driving lane matcher 301 calculates the lane having a maximum matching point among the matching points for each lane as the driving lane matching result. The driving lane tracker 302 calculates the driving lane of the present time depending on the previous driving lane and the lane change information provided from the first lane attribute information extractor 10 and outputs the calculated driving lane of the present time as the driving lane tracking result.

The driving lane determiner 30 determines the driving lane matching result or the driving lane tracking result as a final driving lane depending on a driving lane matching result and a result mode thereof and a driving lane tracking result and a result mode thereof (S13). The fuser 303 determines the driving lane matching result or the driving lane tracking result as a current driving lane of the vehicle depending on the results which are output from the driving lane matcher 301 and the driving lane tracker 302 and a result mode thereof.

As described above, according to the exemplary embodiments of the present invention, it is possible to recognize the driving lane of the vehicle using the front camera and the lane attribute information and track the driving lane depending on the lane change. Therefore, according to the exemplary embodiments of the present invention, it is possible to expand an operating range of the control and convenience system linked with the map (or precision map) in a complex road such as a junction and an intersection since the vehicle can expect the driving path as passing through the junction and the intersection.

Further, according to the exemplary embodiments of the present invention, it is possible to increase the operating range and derive new functions associated with the driving lane, even in the control and convenience system irrelevance to the map.

Further, according to the exemplary embodiments of the present invention, it is possible to expect the driving path at the junction or the intersection in real time.

What is claimed is:

1. A method for recognizing a driving lane of a vehicle, the method comprising steps of:
    extracting front lane attribute information of a driving road from a front image and extracting current position lane attribute information using vehicle information and satellite information;
    comparing the front lane attribute information with the current position lane attribute information, calculating numerical matching points for each lane based on a compared result, outputting a lane having a largest value among the calculated numerical matching points for each lane as a driving lane matching result, and calculating a driving lane tracking result based on a previous driving lane and lane change information; and
    determining any one of the driving lane matching result and the driving lane tracking result as a current driving lane of the vehicle based on the driving lane matching result and the driving lane tracking result,
    wherein a front camera recognition is used as a weight when calculating the numerical matching points,
    wherein the front camera recognition includes a camera recognition related to a style and a color of a lane on the driving road within a predetermined front distance from the vehicle,
    wherein the front camera recognition for a lane closer to the front camera has a value larger than the front camera recognition for a lane farther from the front camera, and
    wherein the front camera recognition for the style of the lane has a value larger than the front camera recognition for the color of the lane.

2. The method according to claim 1, wherein the step of extracting includes:
    extracting the front lane attribute information from the front image acquired through a front camera; and
    calculating a current position and a progress direction of the vehicle using the vehicle information; and
    outputting the extracted current position lane attribute information based on the current position and the progress direction.

3. The method according to claim 1, wherein the step of comparing includes:
    comparing the front lane attribute information with the extracted current position lane attribute information to calculate the numerical matching points of each lane;
    calculating the lane having the largest value among the numerical matching points for each lane as the driving lane matching result; and
    calculating the driving lane of a present time based on the previous driving lane and the lane change information and outputting the calculated driving lane of the present time as the driving lane tracking result.

4. The method according to claim 1, wherein the step of determining includes:
    determining the driving lane matching result or the driving lane tracking result as the current driving lane of the vehicle.

5. The method according to claim 1, wherein the step of determining includes:
    determining the driving lane matching result as the current driving lane of the vehicle when the driving lane matching result is 1 and the driving lane matching result matches the driving lane tracking result within a set time.

6. The method according to claim 1, wherein the step of determining includes:
    determining the driving lane tracking result as the current driving lane of the vehicle when the driving lane matching result is 1 and the driving lane matching result mismatches the driving lane tracking result within a set time.

7. The method according to claim 1, wherein the step of determining includes:
    determining the driving lane matching result as the current driving lane of the vehicle when the driving lane tracking result exceeding a set time is received or the driving lane tracking result is not present and the driving lane matching result is 1.

8. The method according to claim 1, wherein the step of determining includes:
    determining the driving lane tracking result as the current driving lane of the vehicle when a plurality of driving lane matching results are present and the driving lane tracking result is included in the plurality of driving lane matching results.

9. The method according to claim 1, wherein the step of determining includes:
    determines the driving lane tracking result as the current driving lane of the vehicle when a plurality of driving lane matching results are present and the driving lane tracking result within a set time is not included in the plurality of driving lane matching results.

10. The method according to claim 1, wherein the step of determining includes:
    determining the current driving lane of the vehicle as no recognition state when the driving lane tracking result exceeding a set time is not included in a plurality of driving lane matching results or the driving lane tracking result is not present and only the plurality of driving lane matching results are present.

11. The method according to claim 1, wherein the step of determining includes:
    determining the driving lane tracking result as the current driving lane when the driving lane matching result is not present but only the driving lane tracking result is present.

12. The method according to claim 1, wherein the step of determining includes:

determining the current driving lane as no recognition when no driving lane matching result and driving lane tracking result are present.

\* \* \* \* \*